United States Patent
Gupta

(10) Patent No.: US 8,433,304 B2
(45) Date of Patent: Apr. 30, 2013

(54) SYSTEM AND METHOD FOR DISPLAYING CELLULAR CALLER ID ON TV

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 516 days.

(21) Appl. No.: 12/358,038

(22) Filed: Jan. 22, 2009

(65) Prior Publication Data

US 2010/0184486 A1 Jul. 22, 2010

(51) Int. Cl.
 *H04M 3/42* (2006.01)
 *H04M 1/56* (2006.01)

(52) U.S. Cl.
 USPC .................. 455/415; 379/142.01; 379/142.16

(58) Field of Classification Search .................. 455/415; 379/142.01, 142.16
 See application file for complete search history.

(56) References Cited

U.S. PATENT DOCUMENTS

| | | | |
|---|---|---|---|
| 6,882,709 B1 | 4/2005 | Sherlock et al. | |
| 7,835,506 B2 | 11/2010 | Groff et al. | |
| 2001/0038690 A1 | 11/2001 | Palmer et al. | |
| 2006/0140350 A1 | 6/2006 | Jorasch et al. | |
| 2007/0049290 A1 | 3/2007 | Mullen | |
| 2007/0140150 A1* | 6/2007 | Beck et al. ..................... | 370/279 |
| 2007/0140299 A1 | 6/2007 | Hofmann et al. | |
| 2007/0254628 A1 | 11/2007 | Rybak | |
| 2008/0019494 A1* | 1/2008 | Toda ........................ | 379/142.16 |
| 2008/0125098 A1* | 5/2008 | Bruce et al. ................. | 455/414.1 |
| 2009/0186629 A1* | 7/2009 | Soelberg et al. ........... | 455/456.1 |
| 2009/0228940 A1 | 9/2009 | Zampiello | |
| 2010/0186055 A1 | 7/2010 | Gupta | |

OTHER PUBLICATIONS

U.S. Appl. No. 12/358,022, Final Rejection dated Apr. 19, 2012; 17 pages.
U.S. Appl. No. 12/358,022, Non Final Office Action dated Nov. 30, 2011; 29 pages.
U.S. Appl. No. 12/358,022, Non-Final Rejection dated Aug. 8, 2011; 14 pages.
U.S. Appl. No. 12/358,022, Final Rejection dated Oct. 19, 2012: 19 pages.
U.S. Appl. No. 12/358,022, Non-Final Rejection dated Mar. 15, 2013; 19 pages.

\* cited by examiner

*Primary Examiner* — Kamran Afshar
*Assistant Examiner* — Omoniyi Obayanju
(74) *Attorney, Agent, or Firm* — Swanson & Bratschun, L.L.C.

(57) ABSTRACT

Embodiments of the disclosed invention include a system and a method for displaying cellular caller ID on TV. In accordance with one embodiment, the caller ID information of a caller calling a cellular device of a subscriber is received at a mobile switching station. The caller ID information is routed to a cable head end. The cable head end transmits the caller ID information and television content to a home location associated with the subscriber for displaying the caller ID information on a television.

19 Claims, 5 Drawing Sheets

SYSTEM AND METHOD FOR DISPLAYING CELLULAR CALLER ID ON TV

CROSS REFERENCE TO RELATED APPLICATION

The present invention is related to the following patent application: entitled "System and Method for Displaying Call Status on TV", Ser. No. 12/358,022, filed even date hereof, assigned to the same assignee, and incorporated herein in its entirety by reference.

BACKGROUND

More and more service providers are providing blended services to attract and retain loyal customers. For example, some service providers advertise big discounts on a bundled package that includes landline phone service, Internet service, and television service, commonly referred to as a triple play package. Most subscribers who subscribed to these bundled packages often stay with the same service provider out of convenience and/or for the discounted price. In addition, some service providers may also provide cellular service as part of their bundled packages. The blending of the services enables the service provider to provide additional services across the different platforms.

SUMMARY OF THE INVENTION

Embodiments of the disclosed invention include a system and method for displaying cellular caller ID on TV. In one embodiment, the method includes receiving, at a mobile switching station, caller ID information associated with a caller calling a cellular device of a subscriber. The method routs the caller ID information to a cable head end. The cable head end transmits the caller ID information and television content to a home location associated with the subscriber for displaying the caller ID information on a television.

In accordance with another embodiment of the invention, a cellular caller ID reception device located at a cable head end is disclosed. In one embodiment, the cellular caller ID reception device includes memory for storing computer executable instructions; a communications unit for receiving for receiving caller ID information from a mobile network; and a processing unit for executing the computer executable instructions to determine a network address of a set top box associated with a called cellular device and to route the caller ID information via the communication unit to the set top box, wherein the set top box generates a user interface to display the caller ID information on a television.

Additionally, in accordance with another embodiment of the invention, a telephone switch is that includes memory for storing computer executable instructions; and a processing unit for executing the computer executable instructions to route caller ID information associated with a caller to a cable head end, wherein the cable head end transmits the caller ID information and television content to a home location associated with a subscriber of a called cellular device for displaying the caller ID information on a television.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
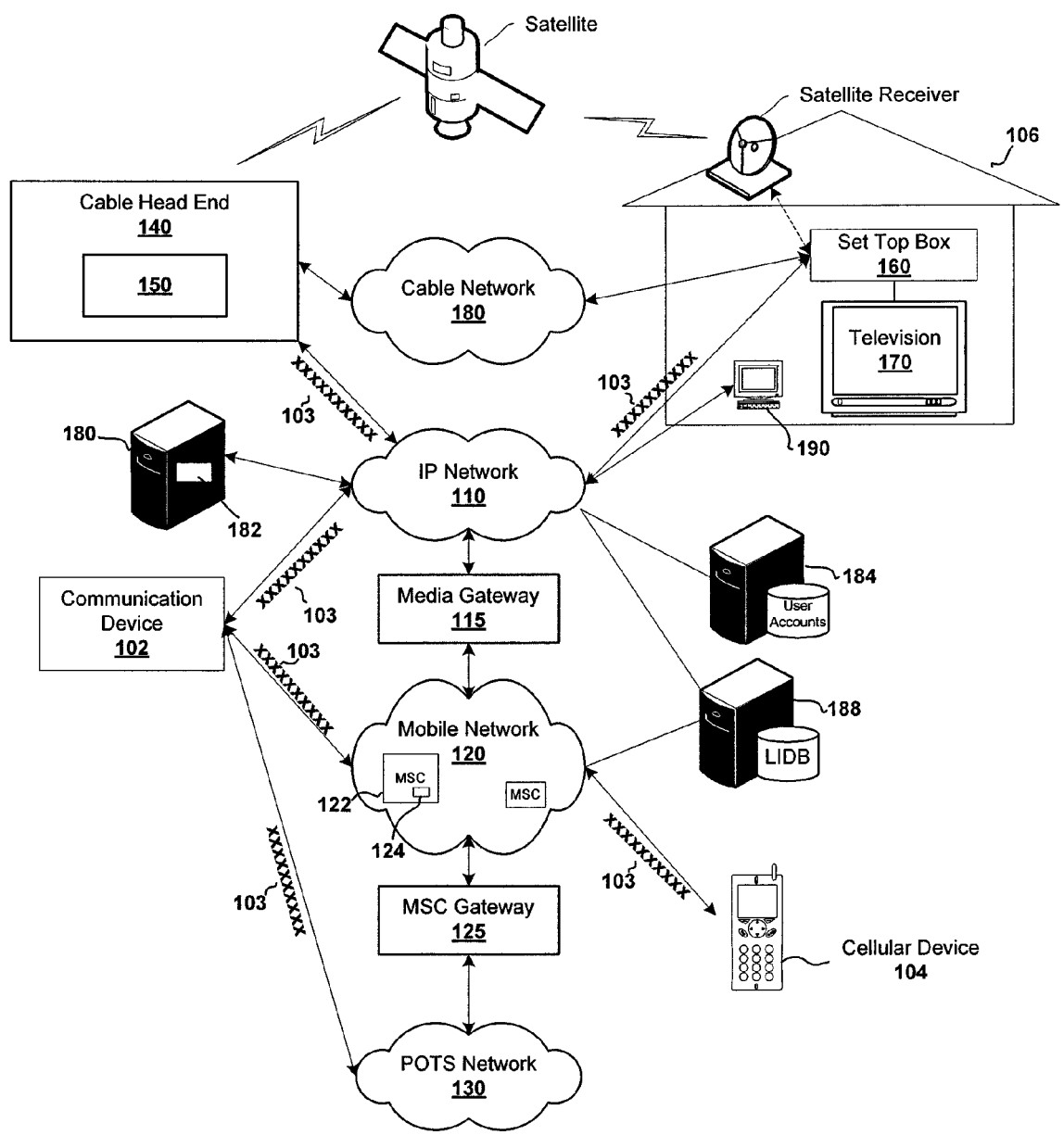
FIG. 1 depicts an embodiment of a network environment in which the illustrative embodiments may be implemented.

FIG. 1 depicts a network environment 100 in which the illustrative embodiments may be implemented for displaying cellular caller ID on TV. As referenced herein, the terms "cellular caller ID" refers to an identification number, such as, but not limited to, a phone number, associated with a communication device that is calling a cellular device. For example, in FIG. 1, communication device 102 places a call to cellular device 104. Communication device 102 may be any type of communication device including, but not limited to, a landline telephone, a wireless mobile phone, and/or a voice over IP phone.

In accordance with one embodiment, communication device 102 transmits, among other things, a phone number 103 associated with communication device 102 when placing a call to communication device 104. Depending on communication device 102's type, the calling information may be a routed over one or more networks, such as, but not limited to, IP network 110, mobile network 120, and plain old telephone service (POTS) network 130 (also known as the Public Switched Telephone Network). In one embodiment, IP network 110, mobile network 120, and POTS network 130 exchange information across different platforms via one or more gateways, such as, but not limited to, media gateway 115 and mobile switching center gateway 125.

Mobile switching center gateway 125 enables the exterior portions of POTS network 130 to access the mobile provider's network associated with communication device 104 in mobile network 120. In one embodiment, mobile switching center gateway 125 determines the current location of communication device 104 in order to connect the call.

Media gateway 115 acts as a translation unit between disparate telecommunications networks, such as, but not limited to, IP network 110, mobile network 120, and plain old telephone service (POTS) network 130. Media gateway 115 enables multimedia communications across Next Generation Networks over multiple transport protocols, such as, Asynchronous Transfer Mode (ATM) and TCP/IP by converting between the different transmissions and coding techniques. For example, in one embodiment, media gateway 115 performs the conversion between TDM voice protocol utilized in circuit switched networks, such as, the POTS network 130 and mobile network 120, to Voice over Internet Protocol (VoIP) utilized in IP network 110.

IP network 110 may include a number of different types of data networks, such as, but not limited to, the Internet, an intranet, a local area network (LAN), a wide area network (WAN), and wireless local area network (WLAN) networks for routing voice over IP calls to communication device 104. The Internet is a global system of interconnected computer networks that interchange data using the standardized Internet Protocol Suite (TCP/IP). The Internet includes minions of private and public networks that are linked by copper wires, fiber-optic cables, wireless connections, and other technologies.

As will be further described, in accordance with one embodiment, a telephone switch 124 located at a mobile switching center, such as, but not limited to, mobile switching center 122, may communicate with one or more data processing systems and/or devices over IP network 110, such as, but not limited to, a server 180, a subscriber account database server 184, a line information database (LIDB) 188, and a cable head end 140, for enabling the display of cellular caller ID on television 170. In some embodiments, telephone switch 124 may comprise, among other things, memory and a processing unit for executing computer executable instructions for enabling the display of cellular caller ID on television 170. Additionally, in some embodiments, telephone switch 124 may comprise solely of logic circuitry configured to receive and route the cellular caller ID information to cable head end 140.

Cable head end 140 is a master facility for receiving television signals and other data for processing and distribution over a cable television system, such as, cable network 180. In some embodiments, cable head end 140 may be an unstaffed facility housing electronic equipment used to receive and re-transmit video and/or other data over cable network 180. In accordance with one embodiment, cable head end 140 may include a cellular caller ID reception device 150.

Cellular caller ID reception device 150 may be software, hardware, or a combination of hardware and software that is configured to receive the cellular caller ID information from mobile network 120 and transmit the cellular caller ID information to a location associated with the receiving cellular device. For example, in some embodiments, cellular caller ID reception device 150 may route the cellular caller ID information using a cable modem. A cable modem is a type of network interface that provides access to a data signal sent over the cable television infrastructure, such as, but not limited to, cable network 180 and/or via satellite. Alternatively, or in addition to, in some embodiments, cellular caller ID reception device 150 may route the cellular caller ID information using Internet Protocol Television (IPTV). IPTV is a system where digital television service is delivered using Internet Protocol over a network infrastructure, such as, but not limited to, IP network 110.

In some embodiments, the cellular caller ID information may be received at residential location 106 via a set top box 160. In one embodiment, set top box 160 includes hardware and/or software for processing the received cellular caller ID information and generating an interface for presenting the cellular caller ID information on television 170. In some embodiments, the cellular caller ID information may be displayed only on a particular channel. In another embodiment, the caller ID information may be displayed as an overlay window over a television program. Further, in some embodiments, a user may configure set top box 160 to display the cellular caller ID information on television 170 for a specified amount of time.

Further, in some embodiments, a user, utilizing a computer, such as, data processing system 190, may subscribe to one or more services as part of their cellular voice service, such as, but not limited to, cellular caller ID on TV service via a website/portal 182 hosted on server 180. In addition, in some embodiments, website/portal 182 may enable a user to designate preferences associated with the cellular caller ID on TV service. For example, in some embodiments, a user may select an option that enables the cellular caller ID on TV service only if communication device 104 is located within a specified distance of a home location, such as, but not limited to, residential location 106. Additionally, in some embodiments, a user may select an option that enables the cellular caller ID on TV service to display the location of the calling device. In one embodiment, the subscribed services and preferences associated with a user account are stored in subscriber account database server 184.

Figure 2:
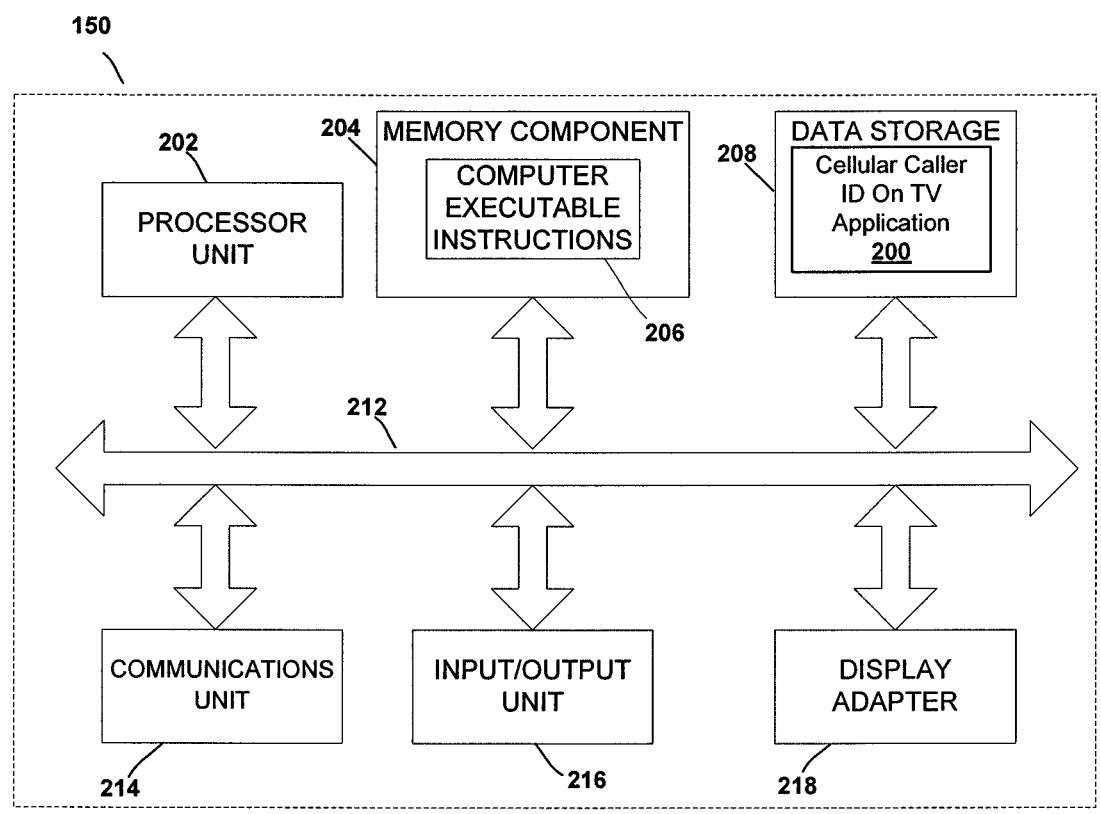
FIG. 2 depicts an embodiment of a cellular caller ID reception device in which an embodiment may be implemented.

FIG. 2 depicts an embodiment of cellular caller ID reception device 150 in which an embodiment may be implemented. In the illustrative embodiment, cellular caller ID reception device 150 includes, but is not limited to, a processor unit 202, a memory component 204, a data storage 208, a communications unit 214, an input/output (I/O) unit 216, and a display adapter 218. A communications fabric 212 provides conductive pathways/traces to mechanically support and electrically connect the various components of cellular caller ID reception device 150 for enabling data communications between the various components.

Processor unit 202 serves to execute computer executable instructions 206 for software that may be loaded into memory component 204. Processor unit 202 may be a set of one or more processors or may be a multi-processor core, depending on the particular implementation. Further, processor unit 202 may be implemented using one or more heterogeneous processor systems in which a main processor is present with secondary processors on a single chip. In some embodiments, processor unit 202 may be a symmetric multi-processor system containing multiple processors of the same type.

Memory component 204 is a data storage component of cellular caller ID reception device 150. In a preferred embodiment, memory component 204 is volatile memory. Volatile memory is memory that loses its contents when cellular caller ID reception device 150 loses power. For example, in one embodiment, memory component 204 may be random access memory (RAM). Random access memory stores currently executing computer executable instructions 206 and/or data associated with an operating system, hardware device, and/or other software applications, such as, but not limited to, Cellular Caller ID on TV application 200. Additionally, in some embodiments, memory component 204 may be embedded memory located on a printed circuit board, such as, but not limited to, a motherboard.

Data storage 208 is a non-volatile memory component of cellular caller ID reception device 150. Data storage 208 stores instructions and data for the operating system and other applications/programs, such as, but not limited to, Cellular Caller ID on TV application 200. Data storage 208 may take various forms depending on the particular implementation. For example, data storage 208 may contain one or more components or devices, such as, but not limited to, a hard drive, a flash memory, a rewritable optical disk, a rewritable magnetic tape, or some combination of the above. In some embodiments, data storage 208 may be removable, such as, a removable hard drive. Additionally, in some embodiments, data storage 208 may be an external component coupled to cellular caller ID reception device 150, such as, but not limited to, an external hard drive.

In one embodiment, Cellular Caller ID on TV application 200 comprises computer executable instructions for receiving the cellular caller ID information from mobile network 120 and routing the cellular caller ID information to a location associated with the receiving cellular device. For example, in some embodiments, Cellular Caller ID on TV application 200 determines a network address/identifier of a set top box associated with the receiving cellular device for transmitting the cellular caller ID information to the appropriate set top box. In some embodiments, the network address identifier of a set top box associated with a particular cellular device may be stored in a user account database, such as, but not limited to, subscriber account database server 184. In addition, in some embodiments, Cellular Caller ID on TV application 200 may retrieve a subscriber name associated with the calling party from line information database (LIDB) 188. Line information database (LIDB) 188 is a database maintained by a telephone company that contains subscriber information, such as, a service profile, name and address, and credit card validation information. Alternatively, in some embodiments, a different network device, such as, but not limited to, electronic device 124, may retrieve the subscriber name and pass the subscriber name and the cellular caller ID information to Cellular Caller ID on TV application 200.

Communications unit 214 enables cellular caller ID reception device 150 to communicate with other data processing systems or devices for receiving and routing the cellular caller ID information to the appropriate destination for displaying of the cellular caller ID information on a television. In one embodiment, communications unit 214 may be a network interface card, such as, but not limited to, an Ethernet card. Alternatively, or in addition to, in some embodiments, communications unit 214 may provide communications using wireless communications links.

Input/output unit 216 allows for input and output of data with other devices that may be coupled to cellular caller ID reception device 150. For example, input/output unit 216 may provide a connection for user input through a keyboard and mouse. Further, input/output unit 216 may send output to a printer and/or other connected devices.

Display adapter 218 provides a mechanism to generate and output images to a display. In some embodiments, display adapter 218 may be a dedicated expansion card that is plugged into a slot on the motherboard of cellular caller ID reception device 150 or may a graphics controller integrated into the motherboard chipset. In addition, display adapter 218 may include dedicated memory and one or more processing units.

The different components illustrated for cellular caller ID reception device 150 are not meant to provide architectural limitations to the manner in which different embodiments may be implemented. Cellular caller ID reception device 150 may be implemented with components in addition to or in place of those illustrated in FIG. 2.

Figure 3:
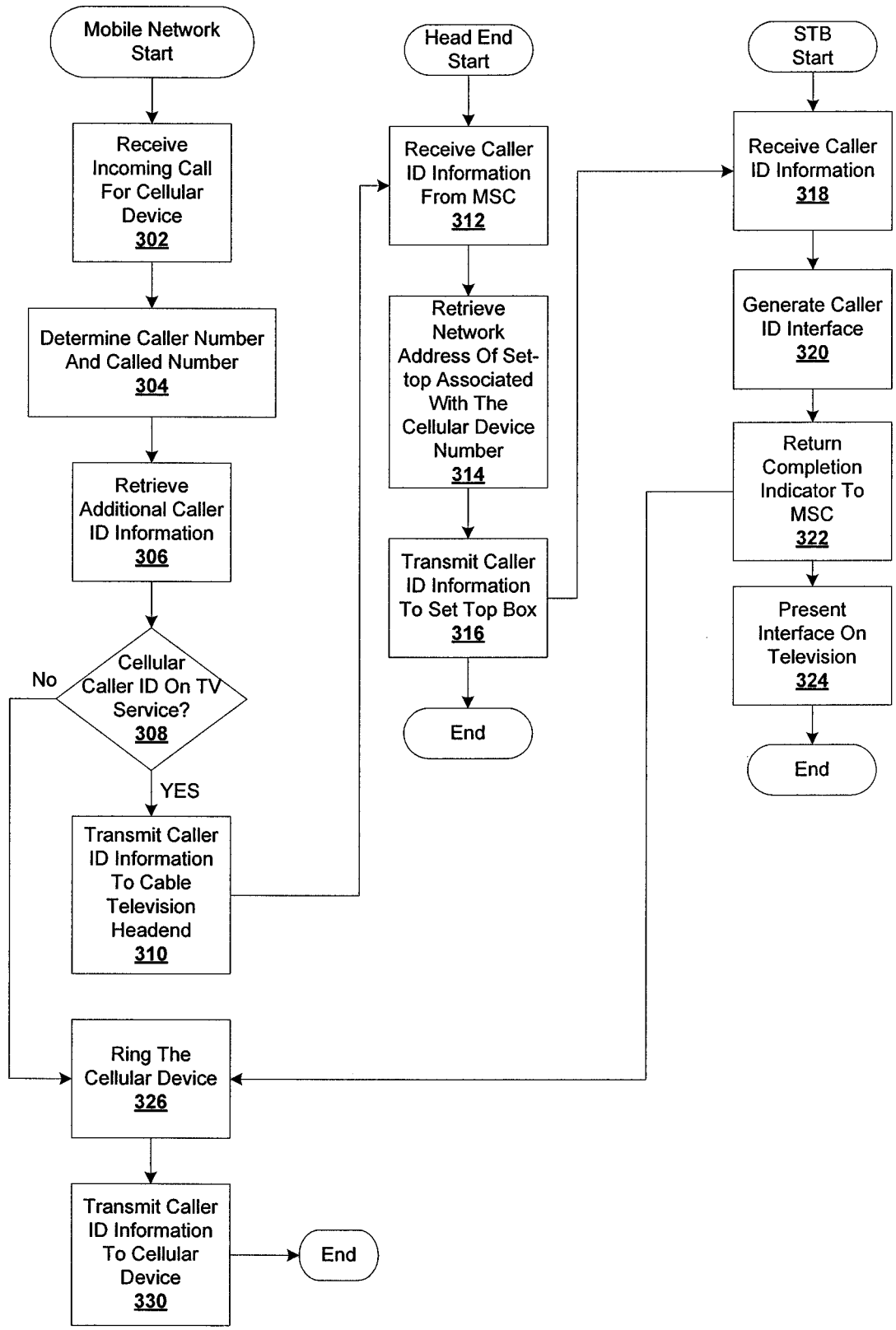
FIG. 3 depicts a flowchart of an embodiment of a process for displaying cellular caller ID on TV.

With reference now to FIG. 3, a flowchart depicting an embodiment of a process 300 for displaying cellular caller ID on TV is presented. In the depicted embodiment, process 300 depicts the interaction between mobile network 120, cable head end 140, and set top box 160. Process 300 begins by receiving an incoming call for a cellular device at step 302. The process identifies a phone number associated with the caller's device and a phone number associated with the called device at step 304. In one embodiment, process 300 may retrieve additional caller ID information, such as, but not limited to, a subscriber name associated with the caller at step 306. At step 308, process 300 retrieves a subscriber account associated with the called phone number to determine whether the subscriber account includes cellular caller ID on TV service. In one embodiment, if the subscriber account does include cellular caller ID on TV service, the process, at step 310, transmits the caller ID information to a cable head end associated with providing cable service to a location associated with the subscriber of the called cellular device. For example, the location associated with the subscriber of the called cellular device may be determined by retrieving a user account associated with the subscriber from subscriber account database server 184. However, if the subscriber account does not include cellular caller ID on TV service, the process rings the called cellular device at step 326, and transmits the caller ID information to the called cellular device at step 330, with process 300 terminating thereafter.

In accordance with one embodiment, at the head end, a reception device receives the caller ID information from the mobile network at step 312. The process retrieves a network address of a set top box associated with the called cellular device at step 314. At step 316, the process transmits the caller ID information over a data network, such as, but not limited to, IP network 110 to the identified set top box.

Additionally, in accordance with the depicted embodiment, the set top box receives the caller ID information at step 318. At step 320, the process generates a caller ID interface using the received caller ID information. In some embodiments, the process transmits a return indicator/value back to mobile network 120 indicating that the set top box has received the cellular caller ID information. In these embodiments, process 300 rings the called cellular device, at step 326. The process transmits the caller ID information to the called cellular device at step 330. At approximately the same time, the process, at step 324, presents the cellular caller ID user interface on a television coupled to the set top box. Alternatively, in some embodiments, the process may ring the called cellular device at step 326 and transmit the caller ID information to the called cellular device at step 330, independent of the process for displaying the cellular caller ID on TV. In other words, in some embodiments, the called cellular device may ring first and the cellular caller ID on TV may appear slightly later on the television depending on the data communication speed of mobile network 120 and IP network 110.

Figure 4:
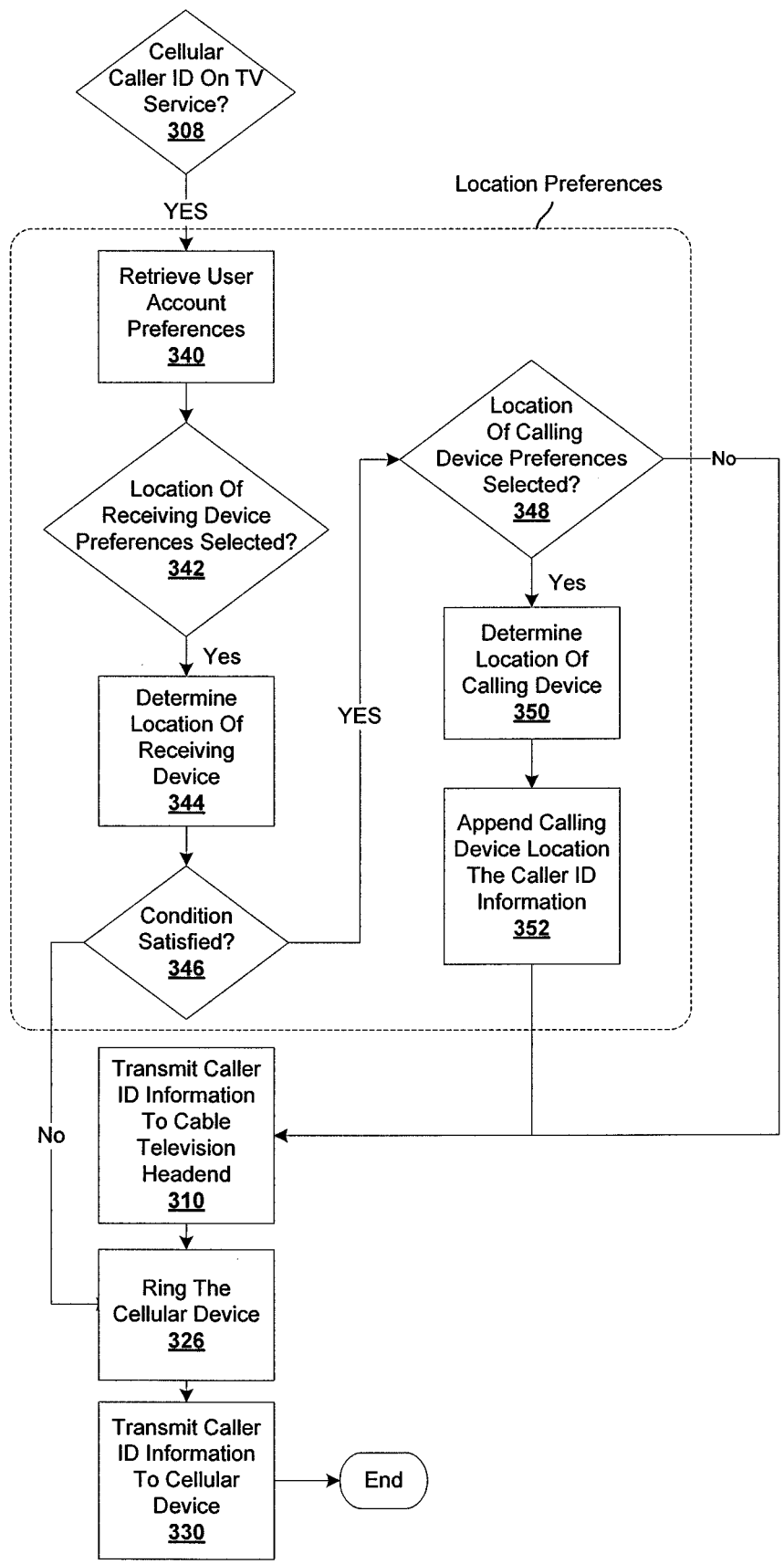
FIG. 4 depicts a flowchart of an embodiment of a process for retrieving location information a cellular device in accordance with one embodiment of the invention.

FIG. 4 depicts another embodiment of process 300 that includes determining user location preferences. For example, in the depicted embodiment, after step 308, the process retrieves user account preferences at step 340. In some embodiments, the user account preferences may be stored in subscriber account database server 184. At step 342, the process determines whether the user preferences indicate that the subscriber desires to only enable cellular caller ID on TV service if the called cellular device is located within a specified distance of a home location, such as, but not limited to, residential location 106. In other words, the user may not want cellular caller ID on TV service to appear on television 170 when the caller is not home. The home location may be the home address associated with the user account or, in some embodiments, the user may specify a different home location.

In these embodiments, the process determines the location of the called cellular device at step 344. For example, in some embodiments, the process may retrieve global positioning coordinates and/or may triangulate the cellular signal associated with the called cellular device to determine its position. Cellular triangulation is a process by which the location of a radio transmitter can be determined by measuring either the radial distance, or the direction, of the received signal from two or three different cell towers. At step 346, the process determines whether the called cellular device is within a specified distance of the home location.

In some embodiments, if the called cellular device is located within the specified distance of home location, the process, at step 348, may also determine whether a user preference indicates that the subscriber desires to know the location of the caller. If the location of the caller preference is selected, the process, at step 350, determines the location of the calling device. For example, in some embodiments, if the calling device originated from POTS network 130, i.e., the calling device is a landline telephone, the location of the calling device may be determined by retrieving an address associated with a caller subscriber account from line information database (LIDB) 188. Similarly, an address associated with a caller subscriber account may be used to determine the location of a call originating from IP network 110, e.g., from a voice over IP phone. In some embodiments, if the call originated from mobile network 120, e.g., a cellular phone, a location of the caller may be determined using cell tower triangulation and/or by retrieving global positioning coordinates associated with the caller's cellular device. At step 352, the process appends the location of the calling device to the caller ID information. The process, at step 310, transmits both the location of the calling device and the caller ID information to the cable head end. The process rings the called cellular device, at step 326, and transmits the caller ID information to the called cellular device at step 330, with process 300 terminating thereafter.

Figure 5:
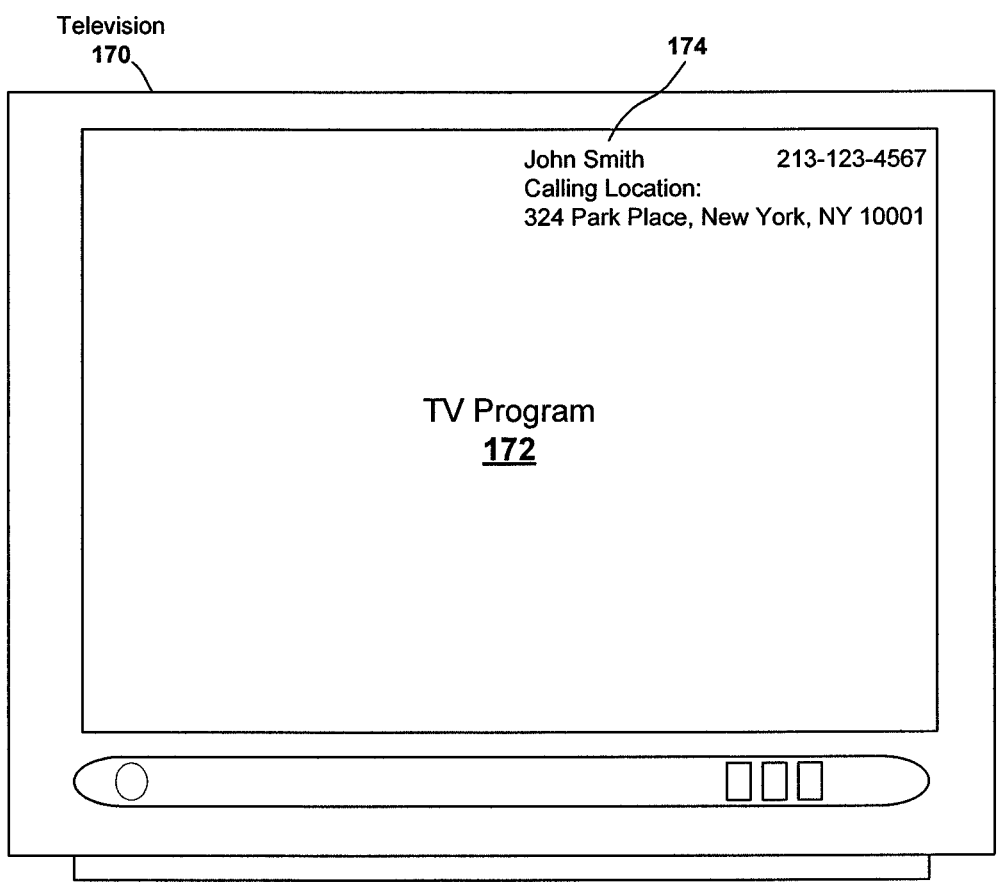
FIG. 5 depicts an embodiment of a cellular caller ID interface displayed on a television.

FIG. 5 depicts an embodiment of a cellular caller ID user interface 174 displayed on television 170. In some embodiments, cellular caller ID user interface 174 is displayed as an overlay window on top of a television program 172. Alternative, in some embodiments, cellular caller ID user interface 174 is displayed on a specified channel.

In the depicted embodiment, cellular caller ID user interface 174 includes a subscriber name and phone number associated with the calling device. In addition, cellular caller ID user interface 174 depicts the current calling location of the caller. Of course, cellular caller ID user interface 174 may include other information in addition and/or in place of the depicted information.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or system. Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A computer implemented method for displaying cellular caller ID on TV, the method comprising:
   receiving, at a mobile switching station, caller ID information associated with a caller calling a cellular device of a subscriber; and
   routing the caller ID information to a cable head end, wherein the cable head end transmits the caller ID information and television content to a home location associated with the subscriber for displaying the caller ID information on a television;
   receiving an indication at the mobile switching station that the cable head end has transmitted the caller ID information to the home location for displaying the caller ID information on the television, wherein the indication is transmitted from the cable head end to the mobile switching station in response to a return indicator that is automatically transmitted, without user input, from the home location to the cable head end upon receipt of the caller ID information at the home location; and
   in response to receiving the indication ringing the cellular device of the subscriber.

2. The method of claim 1, further comprising determining whether a subscriber account associated with the cellular device includes cellular caller ID on TV service.

3. The method of claim 1, wherein the cable head end transmits the caller ID information to the home location over a cable modem network interface for displaying the caller ID information on the television.

4. The method of claim 1, wherein the cable head end transmits the caller ID information to the home location via Internet Protocol Television (IPTV) for displaying the caller ID information on the television.

5. The method of claim 1, further comprising:
   determining location preferences associated with a user account associated with the subscriber; responsive to a determination that the location preferences indicate that the subscriber prefers to know the location of the caller, determining the location of the caller; routing the location of the caller along with the caller ID information to the cable head end, wherein the cable head end transmits the caller ID information and the location of the caller to the home location for displaying the caller ID information and the location of the caller on the television.

6. The method of claim 5, wherein determining the location of the caller further comprises:
   determining the type of calling device associated with the caller ID information of the caller; responsive to a determination that the calling device is a non-cellular device, determining a location of the caller by retrieving the location information from a user account associated with the caller ID information; and
   responsive to a determination that the calling device is a cellular device, determining the location of the caller using cell tower triangulation.

7. The method of claim 1, further comprising:
   determining a location of the cellular device of the subscriber; and
   responsive to a determination that the cellular device of the subscriber is not located within a specified distance of the home location, disabling routing of the caller ID information to the cable head end.

8. The method of claim 1, further comprising:
   retrieving a subscriber name associated with the caller ID information of the caller from a line information database; and
   routing the subscriber name along with the caller ID information to the cable head end, wherein the cable head end transmits the caller ID information and the subscriber name of the caller to the home location for displaying the caller ID information and the subscriber name of the caller on the television.

9. The method of claim 1, wherein a set top box located at the home location receives the caller ID information and television content and generates a caller ID interface using the received caller ID information for displaying the caller ID information on the television.

10. The method of claim 1, wherein the caller ID information is displayed only on a particular channel on the television.

11. The method of claim 1, wherein the caller ID information is displayed as an overlay window over a television program.

12. The method of claim 1, wherein the caller ID information is displayed for a user specified period of time.

13. A cellular caller ID reception device located at a cable head end, the cellular caller ID reception device comprising:
   memory for storing computer executable instructions;
   a communications unit for receiving caller ID information from a mobile switching station; and
   a processing unit for executing the computer executable instructions to:
      determine a network address of a set top box associated with a called cellular device; and
      route the caller ID information via the communication unit to the set top box, wherein the set top box generates a user interface to display the caller ID information on a television;
      transmit a completion indicator to the mobile switching station in response to routing the caller ID information via the communication unit to the set top box, wherein transmitting the completion indicator in response to routing the caller ID information via the communication unit to the set top box includes transmitting the completion indicator in response to a return indicator that is automatically transmitted, without user input, from the home location to the cable head end upon receipt of the caller ID information at the home location, wherein reception of the completion indicator at the mobile switching station triggers the mobile switching station to ring the called cellular device.

14. The cellular caller ID reception device of claim 13, wherein the caller ID information is routed to the set top box using IPTV.

15. The cellular caller ID reception device of claim 13, wherein determining the network address of the set top box associated with the called cellular device includes retrieving a user account associated with a subscriber of the called cellular device.

16. A telephone switch comprising:
  memory for storing computer executable instructions; and
  a processing unit for executing the computer executable instructions to:
    route a caller ID information associated with a caller to a cable head end, wherein the cable head end transmits the caller ID information and television content to a home location associated with a subscriber of a called cellular device for displaying the caller ID information on a television
    receive a completion indicator from the cable head end, wherein the completion indicator is transmitted from the cable head end to the mobile switching station in response to a return indicator that is automatically transmitted, without user input, from the home location to the cable head end upon receipt of the caller ID information at the home location, wherein reception of the completion indicator at the telephone switch triggers the telephone switch to ring the called cellular device.

17. The telephone switch of claim 16, wherein the processing unit further executes the computer executable instructions to determine whether a subscriber account associated with the called cellular device includes cellular caller ID on TV service.

18. The telephone switch of claim 16, wherein the processing unit further executes the computer executable instructions to determine a location of the called cellular device and responsive to a determination that the called cellular device is not located within a specified distance of a home location, disabling routing of the caller ID information to the cable head end.

19. The telephone switch of claim 16, wherein the processing unit further executes the computer executable instructions to receive an indication that the cable head end has transmitted the caller ID information to the home location for displaying the caller ID information on the television.

* * * * *